United States Patent [19]

Neumüller

[11] Patent Number: 5,798,446

[45] Date of Patent: Aug. 25, 1998

[54] METHOD OF EXTRACTING PROTEINS UTILIZABLE IN FOODSTUFF FROM A PROTEIN-CONTAINING SUBSTANCE

[75] Inventor: Waldemar Neumüller, Göttngen, Germany

[73] Assignee: Nupron GmbH Proteinwerk, Northen-Hardenberg, Germany

[21] Appl. No.: 730,991

[22] Filed: Oct. 16, 1996

Related U.S. Application Data

[63] Continuation-in-part of Ser. No. 211,602, Aug. 15, 1994, abandoned.

[30] Foreign Application Priority Data

Oct. 10, 1991 [DE] Germany ............ 41 35 538.4

[51] Int. Cl.⁶ .................. A23J 3/14; A23J 1/00; A23J 3/00; C07K 14/415

[52] U.S. Cl. ............. 530/370; 530/361; 530/372; 530/375; 530/376; 530/377; 530/378; 530/414; 530/418; 530/422; 530/423; 530/424; 530/427; 426/481; 426/506; 426/507; 426/519; 426/615; 426/629; 426/634; 426/637; 426/640

[58] Field of Search ............... 530/350, 412, 530/414, 418, 422, 423, 424, 427, 361, 370, 372, 375, 376, 377, 378; 426/481, 506, 507, 519, 615, 629, 634, 637, 640

[56] References Cited

U.S. PATENT DOCUMENTS

| | | | |
|---|---|---|---|
| 4,038,437 | 7/1977 | Chandler et al. | 426/656 |
| 4,259,361 | 3/1981 | Proctor | 426/285 |
| 4,624,805 | 11/1986 | Lawhon | 530/376 |
| 4,915,972 | 4/1990 | Gupta et al. | 426/598 |

FOREIGN PATENT DOCUMENTS

| | | |
|---|---|---|
| 571734 | 10/1958 | Belgium. |
| 2500200 | 7/1975 | Germany. |
| 2814922 | 10/1979 | Germany. |
| WO91/12730 | 9/1991 | WIPO. |

OTHER PUBLICATIONS

Lawhon et al., Utilization of Cotton Seed Whey Protein Concentrates Produced by Ultra Filtration, J. Food Science, vol. 39 (1974) pp. 183–186.

Groot et al., Effects of Severe Alkali Treatment of Proteins on Amino Acid Composition and Nitritic Value, J. Nutrition 98 pp. 45–56 (1969).

Ose; Production and Functionality of Starches and Protein Isolates from Legume Seeds (Field Peas and Horsebeans), Cereal Chem., 57(6) (1980) pp. 406–410.

Staron, Une Methode d'Obtrention des Proteins Vegetables Pour a l'Alimmtation Humaine et Animale, Industries Alimentaines of Agricoles (1977) pp. 1197–1217.

Esen, Estimation of Protein Quality and Quantity in Corn by Assayirs Protein in Two Solubility Fractions, J. Agric. Food Chem., vol. 28 (3) (1980).

Mieth et al., Trends bei Verarbeitung von Ölsamen Und–Früchten, Die Gleichzeitige Fewinnung von Olenund Proteinein, Die Mahrung (1975) pp. 687–688.

*Primary Examiner*—Ponnathapura Achutamurthy
*Attorney, Agent, or Firm*—Thomas, Kayden, Horstemeyer & Risley

[57] ABSTRACT

In the method described, a protein-containing substance is first taken up in an alkaline solvent to give a solution. Insoluble constituents of the substance are separated off, the solution is neutralized and desalinated, and then the proteins contained in the solution are concentrated. The solubilization or disintegration of the protein-containing substance is carried out at room temperature using homogenization equipment. The heat dissipated into the protein-containing substance during homogenization is simultaneously removed. The pH of the alkaline solvent during the decomposition is over 11.5 and/or decomposition is carried out in the presence of a detergent, in particular sodium dodecylsulfate (SDS).

17 Claims, No Drawings

METHOD OF EXTRACTING PROTEINS UTILIZABLE IN FOODSTUFF FROM A PROTEIN-CONTAINING SUBSTANCE

RELATED APPLICATION

This application is a continuation-in-part of U.S. patent application Ser. No. 08/211,602 filed Aug. 15, 1994, now abandoned.

FIELD OF THE INVENTION

The invention relates to a method for the production of proteins suitable for foodstuff from a protein-containing substance. The protein-containing substance is dissolved through the disintegration of the protein-containing substance in an alkaline solvent and while homogenizing, wherein the thermal energy introduced by the homogenizing is simultaneously extracted from the solution. In one embodiment, the alkaline solvent has a pH-value larger than 11.5, especially approximately 12.5. Alternatively, the disintegration of the protein-containing substance takes place in the presence of a detergent, preferably sodium dodecylsulfate (SDS). After the disintegration, the insoluble components of the substance are separated from the solution, the solution is desalinated after neutralization, and the proteins contained in the solution are concentrated and isolated by a drying process.

BACKGROUND OF THE INVENTION

In the production of starch from potatoes, of flour from grains, of tofu, and of oil from various plants, protein-containing substances are byproducts. The use of these proteins containing substance is not possible or is very difficult until now. For example, the production of starch from potatoes yields denatured and not further dispersable potato protein concentrates that are not suitable as foodstuff. The production of flour results in glutene as a byproduct, which can be used only in limited ways, due to its sticky consistency. Byproducts of tofu and oil production are protein-containing meals that also are unsuitable as foodstuff.

A method of extracting protein from agricultural commodities is known from U.S. Pat. No. 4,624,805 to Lawhon. The extraction is to be performed at a temperature not exceeding 55° C. (130° F.). The lowest temperature disclosed in this patent for the extraction of the protein-containing substance is 37.8° C. (100°). Homogenizing of the protein-containing substance during the extraction may be performed by means of ultrasonics. The method does not involve the use of a detergent.

A method of recovery of proteins from cereal grains is also known from WO-A-9112730. Disintegration of the protein-containing substance is performed simultaneously with micro-milling. The use of a detergent is not provided.

A method for the production of proteins suitable for foodstuff from a protein-containing substance is known from the "Journal of Food Science" (Vol. 39, 1974, pp. 183–186), "Utilization of cottonseed whey protein concentrates produced by ultrafiltration". The proteins are dissolved in this method through the extraction of the protein-containing substance in an allaine solvent. The unsoluble components of the substance are separated from the solution, the solution is desalinated after neutralization, and the proteins contained in the solution are concentrated and isolated by a drying process. This method does not address the problem of hydrolysis of the proteins and the resulting lysinoalanines and other hydrolysis products, which severally limit the use of the concentrated products for foodstuff.

A method for the production of proteins suitable for foodstuff from a protein-containing substance, in which the proteins contained in a solution are concentrated and isolated by a drying process, is also known from the German Offenlegungsschrift 28 14 922. This method serves for the production of native potato protein from potato fruit water which is derived as a byproduct of starch production during the crushing of the potatoes. The potato proteins contained in the fruit water are coagulated by souring and heating the potato fruit water in the presence of $SO_2$. The non-coagulated fraction is then filtered off as well as possible and the resulting filter cake is dried. Alternatively, the proteins contained in a partially concentrated potato fruit water solution are spray dried. For extraction of the glycoalkaloid solanine, large amounts of which are contained in the potato protein produced in this way, acidic extraction with an organic solvent, chosen from the group containing methanol, n-butanol and isopropanol, is suggested. The coagulated potato proteins are to be subjected to this extraction. A disadvantage of this method is the necessity to integrate it directly into the starch production process. The potato fruit water must be processed promptly, due to its high oxidation sensitivity. Even in the prompt processing of the potato fruit water the addition of anti-oxidation agents is recommended by the German Offenlegungsschrift 25 00 200. The direct coupling of the method to the starch production process leads, inter alia, to the fact that it can only be applied during the potato season. The rest of the year the corresponding machinery is not in use. The method was also not successful because of the high investments that are necessary and the use of large amounts of chemicals during the process. Further, the potato protein in the potato fruit water produced during the starch production is coagulated and dried without further processing which results in a denatured and not further dispersable byproduct.

In the production of tofu it is known to boil protein-containing soy meal in an aqueous solution with a pH-value of up to 9.0. While part of the proteins then goes into the solution, a considerable rest remains in the soy meal, leading to low yields.

From the journal "Die Nahrung" (Vol. 19, No. 8, 1975, pp. 687–688), "Trends in the processing of oil seed and oil fruit. The simultaneous production of oils and proteins.", a method for the simultaneous production of oils and proteins from vegetable raw materials is known. Disintegration of the vegetable raw materials is done using ultrasonic devices or high frequency disintegration aggregates. The disintegration serves the sole purpose of cell destruction, as is literally stated in the article. In this way the extraction of the oils and proteins from the vegetable raw materials is simplified or made possible at all.

DETAILED DESCRIPTION OF THE INVENTION

It is an object of the present invention to further develop a method of the type described above, wherein a variety of protein-containing substances can be used as starting materials, and so that, for example, the byproduct of starch production from potatoes may be processed, without the occurrence of hydrolysis damage to the products of the method.

Other plant starting materials can be used in the method including, but not limited to, wheat, corn, soybeans, and rape. Animal starting materials could also be used, enabling, for example, the extraction of casein. Bacterial starting products could also be used.

According to the invention, extraction, or solubilization, of proteins from the protein-containing substance is achieved by disintegrating the protein-containing substance at room temperature and homogenizing by means of high pressure disintegration. High-pressure disintegration or homogenization is commonly used as a method of cell disruption. In general, a cell suspension is passed through a valve and hits an impact ring (e.g. Manton-Gaulin homogenizer). The cells are ruptured by shearing forces and simultaneous decompression. Depending on the type of machine, its capacity ranges from 50 to 5000 L/h. Efficient cooling must be provided to avoid damaging heat exposure.

Surprisingly, it has been found that a number of otherwise non-dispersable protein-containing substances can be disintegrated at room temperature in a strongly alkaline solvent, during which no considerable hydrolysis damage occurs, in spite of the high pH-value of more than 11.5. The disintegrated proteins have a structure comparable to native proteins for a coagulated starting substance. During the disintegration it is primarily the proteins contained in the substance that go into solution, so that insoluble components are easily separated using a centrifuge or by suitable filtering techniques. Homogenizing the mixture of protein-containing substance and alkline solvent by high pressure disintegration extremely accelerates the disintegration of the proteins. This guarantees the possibility of industrial-scale application of the new method.

The thermal energy introduced into the mixture during the homogenizing should be extracted from the mixture, for instance using a heat exchanger. Heating of the mixture above room temperature should be avoided, in order not to support the hydrolysis of the proteins.

High pressure homogenizing is known e.g. from the homogenizing of milk. Corresponding machinery may be used for the new method. For example, a high pressure disintegration apparatus made by APV Gaoline may be used. This apparatus has a 50 L capacity tank. Fluid is removed from the tank, compressed and released, and bypassed back into the tank. This arrangement is referred to as homogenization in bypass. This apparatus compresses 900 L/h, i.e. within 30 minutes the contents of the tank are compressed and released 9 times. The pressure applied to the fluid is 180–200 bar.

The degree of disintegration achieved with high pressure homogenization would be very difficult or impossible to achieve using sonication, on an industrial scale. For one thing, it would be very difficult to introduce sufficient energy for homogenization of protein-containing substances into a large-scale solution using sonication. Also, there is a danger of locally overheating the protein-containing solution if ultrasound sources of high power are used. This is due to the local short time compression of the solution by the ultrasound waves that can cause local temperatures of above 1000° C.

In the present inventive method, the temperature of the solution is maintained at or below about 25° C. (room temperature). This is accomplished by extracting the thermal energy from the solution that is produced by the high-speed homogenization. Because the increase of pressure in the solution is comparatively slow, it is relatively easy to extract the thermal energy. Extraction of the thermal energy can be accomplished by passing the solution through one or more heat exchangers.

In one embodiment of the invention, the alkaline solvent should have a pH-value higher than 11.5. In conjunction with homogenizing of the mixture of solvent and protein-containing substance a pH-value of approximately 12.5 has proven to be especially advantageous during disintegration of the proteins.

In another embodiment, the disintegration should take place in the presence of a detergent. An especially well suited detergent is sodium dodecylsulfate (SDS). It may easily be precipitated with potassium salts and separated from the proteins in this way. In principle other detergents can be used, as long as they can be separated from the proteins. The use of detergents allows the disintegration e.g. of meal resulting from tofu production and oil production from plants to take place at room temperature and a pH-value below 10. The amount of SDS necessary for this, save for a harmless remainder, can be precipitated without any problems using potassium salts.

The pH of the protein-containing substance is adjusted using an alkali. Suitable alkalis are NaOH, KOH, Ca(OH)$_2$, CaCO$_3$, and MgOH. Typically, a 0.2 molal alkali solution is used to adjust the pH of the protein-containing solution. For the disintegration process using high-speed homogenization, the dispersion pH is adjusted by the addition of 0.2 molal alkali solution. For the disintegration using a detergent, a solution of 1% SDS in 0N NaOH is added until the dispersion has a pH between about 9.5 and 10.0.

The alkaline solvent may be an alcohol solution. Alcohol solutions as alkaline solvents are especially well suited for economic application of the new method. Preferably, the solvent may include up to 50% alcohol, such as ethanol.

Often further processing, i.e. cleaning the solution of accompanying substances, may be sensible. In the first step after disintegration, the insoluble components are removed from the solution by centrifugation or filtration. For example, centrifugating at 4500×g for about two minutes will typically pellet insolubles. Neutralizing and desalinating the alkaline solution leads to a highly nutritious, neutrally flavored end product.

Neutralizing the solution can be accomplished by the addition of a non-oxidizing acid such as hydrochloric acid, acetic acid or formic acid so that a pH of between about 6.5 and 7.5 is obtained.

The proteins contained in the solution can be concentrated with the aid of ultrafiltration and the solution can be desalinated with the aid of diafiltration. The known method of ultrafiltration for concentrating the solution allows the filtered-off solvent to be reused and reduces the amount of heat needed to dry the proteins. Diafiltration to desalinate the solution is so that the use of additional chemicals is not necessary. Furthermore, further processing, i.e. cleaning, of the solution is connected to the diafiltration. The exclusion limit of the diafiltration is advantageously approximately 10,000 Daltons so that salts and other low molecular weight molecules are removed from the solution.

Organoleptic compounds, especially glycoalkaloid and lipids, may be separated by acidic extraction, especially with ethanol and glacial acetic acid, and subsequent hotfiltration from the protein-containing substance before its disintegration. This step in the process is sensible especially for the removal of the solanine from substances containing potato protein. For the amount of chemicals necessarily applied, it proves to be advantageous to perform the acidic extraction on the mechanically crushed but not yet disintegrated substance. Under the aspect of being suitable for foodstuff, the use of a mixture of ethanol and glacial acetic acid for the acidic extraction is sensible. In principle other alcohols may also be used, though. Acid extraction involves boiling the protein-containing substance in a solution of 98% ethanol/

2% glacial acetic acid while refluxing. An extraction treatment with alcohol should not be used for glutene since glutene contains alcohol soluble proteins.

The protein-containing substance may be defattened by extraction with hexane before its disintegration. Such processing is taught in WO 91/12730, which disclosure is incorporated herein by reference. This additional process step is indicated primarily in the processing of glutene.

The protein-containing substance may be acidified at the beginning of the disintegration. Acidifying of the protein-containing substance has proven to be sensible and to accelerate the disintegration especially in the processing of glutene. Typical acids that can be used are acetic acid, formic acid, hydrochloric acid, or any other nonoxidizing acid. Typically, the protein-containing substance is dispersed in a 50% ethanol/50% water solution. The acid is then added until a pH of about 5.5 is achieved. A treatment time of about 10 minutes is generally sufficient. The dispersion can then be subjected to the disintegration procedure.

Disintegration of the protein-containing substance may be performed in the presence of hydrogen peroxide. The use of hydrogen peroxide in the disintegration of the protein-containing substance makes pH-precipitation of the disintegrated proteins possible, which simplifies their concentrating prior to the drying process. Furthermore, the hydrogen peroxide results in a lighter coloring and a longer-chained structure of the foodstuff-suitable proteins obtained in this way.

The invention is further explained and described with the aid of the following illustrative examples. It should not be presumed that the invention is limited to the following examples:

EXAMPLE 1

Contaminated potato proteins resulting from the production of starch from potatoes, containing 80 to 85 percent proteins, 8 to 10 percent lipid-like compounds, 1 to 2 percent minerals, and up to 0.12 percent solanine are mechanically crushed by milling. Acid extraction is then carried out. A mixture of 98 percent by volume ethanol and 2 percent by volume glacial acetic acid is added to the contaminated potato protein. 3 to 5 liters of the mixture of ethanol and glacial acetic acid are used per kilogram of the contaminated protein. The contaminated potato protein is then boiled for 20 minutes under backflow and constant stirring in the mixture of ethanol and glacial acetic acid, at a temperature of 80° C. After boiling the decoction is hot-filtered and the residue is again added to 3 to 5 liters of the mixture of ethanol and glacial acetic acid and boiled for 20 minutes under backflow and stirring. Depending on the initial content and the desired final content of the glycoalkaloid solanine this step may be repeated a number of times..When the extraction is finished, the residue is either processed further directly, or it is dried for intermediate storage.

The residue containing the potato protein is then stirred into a solution containing 50 percent of ethanol, during which a high pressure disintegrator is operated in bypass of the mixing vessel. In this step, up to 20 liters of solvent are used for each kg of residue. A 30 percent solution of hydrogen peroxide is added to the solvent, so that its concentration corresponds to a twofold molar surplus of cysteine. After adding up to 0.2 mole alkaline per kg residue (0.2 molal) more hydrogen peroxide is continuously added. Altogether between about 50 and 100 ml of a 30 percent hydrogen peroxide solution is added for each kg of residue to be disintegrated. Homogenizing takes place during the whole time. Complete disintegration of the potato protein-containing residue takes about 30 minutes.

The solution produced by the disintegration is then centrifuged at 4500×g for two minutes, in order to pellet and separate off insoluble components of the potato protein. Concentrating of the solution is done with the aid of ultrafiltration, using a membrane with an exclusion limit of less than 10 000 Dalton. During concentration of the solution approximately 70 percent of the initial value is removed.

After neutralizing the concentrated solution it is desalinated and cleaned with the aid of diafiltration. In other words, low molecular weight molecules are removed from the solution by passing the solution over a 10,000 MW filter. In the last step of the process the residual solution is spray dried. The dried potato protein has a composition of 89 to 93 percent protein (N×6.25), 3 to 5 percent ashes, approximately 0.4 percent fat and less than 0.01 percent solanine. This solanine content is below that of a peeled potato with 0.012 percent of the dry substance. The fraction of dry substance in the spray dried potato proteins is between 92 and 95 percent.

EXAMPLE 2

Meal resulting from the oil production of e.g. plants like soy and rape is disintegrated after mechanical crushing directly in diluted soda lye. Here, the pH-value of the soda lye is 12.5, as long as the mixture of the crushed meal and the soda lye is homogenized during the disintegration. If the mixture is only stirred, a 0.1 normal soda lye with a pH-value of 13 should be used, and disintegration takes some hours. If the mixture is homogenized with high-speed homogenization, disintegration takes only a few minutes.

The solution resulting from the disintegration is further processed in analogy to Example 1, in order to isolate the proteins in a form suitable for foodstuff.

EXAMPLE 3

The disintegration of protein-containing meal resulting from the oil production of plants or other substances difficult to disintegrate may be performed alternatively to Example 2 in the presence of sodium dodecylsulfate (SDS). 1 percent of SDS is added to a solvent of 0.1 normal soda lye. If the disintegration of the crushed meal in the solvent is performed under homogenizing by ultrasonics, the amount of alkaline may be reduced until a pH-value of less than 10 is reached. After 30 minutes, centrifuging at 4500×g is performed and the residue is decanted. An amount of potassium salt (KCl) is added to the residue, so that the potassium concentration corresponds to a threefold surplus relative to the amount of sodium dodecylsulfate (SDS) used. After stirring for 15 minutes there is a precipitate, which is separated by centrifuging at 4500×g. In this way 95 to 98 percent of the SDS may be removed. The remaining SDS concentration is below the critical micelle concentration (CMC). The residue remaining after the removal of the SDS is concentrated by means of ultrafiltration using membranes with an exclusion limit of less than 10 000 Dalton, neutralized, and desalinated by means of diafiltration. The diafiltration removes the rest of the SDS remaining in the solution after the precipitation with potassium salt.

While the foregoing specification discloses preferred embodiment of the invention, it will be understood that variations and modifications thereof can be made without departing from the spirit and scope of the invention, as set forth in the following claims.

What is claimed is:

1. A method for the production of proteins suitable for foodstuff from a protein-containing, plant based substance, comprising the steps of:

homogenizing a mixture of the protein-containing substance and an alkaline alcohol solution having a pH greater than 11.5 to form a second solution, said homogenizing conducted at room temperature and by high pressure disintegration, whereby the proteins contained in the substance are dissolved into the second solution;

during the step of homogenizing, extracting thermal energy from the second solution introduced by the homogenization so that the temperature of the second solution is maintained at room temperature;

separating insoluble components from the second solution;

neutralizing the second solution;

desalinating the second solution; and concentrating the proteins contained in the second solution by a drying process.

2. A method for the production of proteins suitable for foodstuff from a protein-containing, plant based substance, comprising the steps of homogenizing a mixture of the protein-containing substance and an alkaline solvent having a pH greater than 11.5 to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution via diafiltration; and concentrating the proteins contained in the solution by ultrafiltration followed by a drying process.

3. A method for the production of proteins suitable for foodstuff from a protein-containing, plant based substance, comprising the steps of:

separating organoleptic compounds from the protein-containing substance by acidic extraction and subsequent hot-filtration;

after the step of separating organoleptic compounds from the protein-containing substance, homogenizing a mixture of the protein-containing substance and an alkaline solvent having a pH greater than 11.5 to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution; and concentrating the proteins contained in the solution by a drying process.

4. The method according to claim 3, wherein the acidic extraction is performed with ethanol and glacial acetic acid.

5. A method for the production of proteins suitable for foodstuff from a protein-containing, plant based substance, comprising the steps of:

defattening the protein-containing substance by extraction with hexane;

after the defattening step, homogenizing a mixture of the protein-containing substance and an alkaline solvent having a pH greater than 11.5 to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution; and concentrating the proteins contained in the solution by a drying process.

6. A method for the production of proteins suitable for foodstuff from a protein-containing, plant based substance, comprising the steps of:

acidifying the protein-containing substance;

after the acidifying step, homogenizing a mixture of the protein-containing substance and an alkaline solvent having a pH greater than 11.5 to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution; and concentrating the proteins contained in the solution by a drying process.

7. A method for the production of proteins suitable for foodstuff from a protein-containing, plant based substance, comprising the steps of:

homogenizing a mixture of the protein-containing substance and an alkaline solvent having a pH greater than 11.5 to form a solution, said homogenizing conducted at room temperature and by high pressure disintegration in the presence of hydrogen peroxide, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution; and concentrating the proteins contained in the solution by a drying process.

8. A method for the production of proteins suitable for foodstuff from a protein-containing, plant based substance, comprising the steps of:

homogenizing a mixture of the protein-containing substance and an alkaline solvent having a pH of approximately 12.5 to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained at room temperature;

separating insoluble components from the solution;

neutralizing the solution;

desalinating the solution; and concentrating the proteins contained in the solution by a drying process.

9. A method for the production of proteins suitable for foodstuff from a protein-containing, plant based substance, comprising the steps of:

homogenizing a mixture of the protein-containing substance and a detergent to form a solution, said homogenizing conducted at room temperature and by high pressure disintegration, whereby the proteins contained in the substance are dissolved into the solution;

during the step of homogenizing, extracting thermal energy from the solution introduced by the homogenization so that the temperature of the solution is maintained substantially at room temperature;

separating insoluble components from the solution;

neutralizing the solution;

desalinating the solution; and concentrating the proteins contained in the solution by a drying process.

10. A method for the production of proteins suitable for foodstuff from a protein-containing, plant based substance, comprising the steps of:

homogenizing a mixture of the protein-containing substance and sodium dodecylsulfate (SDS) to form a solution, said homogenizing conducted at room temperature and by high pressure disintegration, whereby the proteins contained in the substance are dissolved into the solution;

during the step of homogenizing, extracting thermal energy from the solution introduced by the homogenization;

separating insoluble components from the solution;

neutralizing the solution;

desalinating the solution; and concentrating the proteins contained in the solution by a drying process.

11. The method according to claim 10, wherein the sodium dodecylsulfate (SDS) is precipitated after the disintegration using potassium salts.

12. A method for the production of proteins suitable for foodstuff from a protein-containing, plant based substance, comprising the steps of:

homogenizing a mixture of the protein-containing substance and a detergent to form a solution, said homogenizing conducted at room temperature and by high pressure disintegration, whereby the proteins contained in the substance are dissolved into the solution;

during the step of homogenizing, extracting thermal energy from the solution introduced by the homogenization;

separating insoluble components from the solution;

neutralizing the solution;

desalinating the solution via diafiltration; and concentrating the proteins contained in the solution by ultrafiltration followed by a drying process.

13. A method for the production of proteins suitable for foodstuff from a protein-containing, plant based substance, comprising the steps of:

separating organoleptic compounds from the protein-containing substance by acidic extraction and subsequent hot-filtration;

after the step of separating organoleptic compounds from the protein-containing substance, homogenizing a mixture of the protein-containing substance and a detergent to form a solution, said homogenizing conducted at room temperature and by high pressure disintegration, whereby the proteins contained in the substance are dissolved into the solution;

during the step of homogenizing, extracting thermal energy from- the solution introduced by the homogenization;

separating insoluble components from the solution;

neutralizing the solution;

desalinating the solution; and concentrating the proteins contained in the solution by a drying process.

14. The method according to claim 13, wherein the acidic extraction is performed with ethanol and glacial acetic acid.

15. A method for the production of proteins suitable for foodstuff from a protein-containing, plant based substance, comprising the steps of:

defattening the protein-containing substance by extraction with hexane;

after the defattening step, homogenizing a mixture of the protein-containing substance and a detergent to form a solution, said homogenizing conducted at room temperature and by high pressure disintegration, whereby the proteins contained in the substance are dissolved into the solution;

during the step of homogenizing, extracting thermal energy from the solution introduced by the homogenization;

separating insoluble components from the solution;

neutralizing the solution;

desalinating the solution; and concentrating the proteins contained in the solution by a drying process.

16. A method for the production of proteins suitable for foodstuff from a protein-containing, plant based substance, comprising the steps of acidifying the protein-containing substance;

after the acidifying step, homogenizing a mixture of the protein-containing substance and a detergent to form a solution, said homogenizing conducted at room temperature and by high pressure disintegration, whereby the proteins contained in the substance are dissolved into the solution;

during the step of homogenizing, extracting thermal energy from the solution introduced by the homogenization;

separating insoluble components from the solution;

neutralizing the solution;

desalinating the solution; and concentrating the proteins contained in the solution by a drying process.

17. A method for the production of proteins suitable for foodstuff from a protein-containing, plant based substance, comprising the steps of:

homogenizing a mixture of the protein-containing substance and a detergent to form a solution, said homogenizing conducted at room temperature and by high pressure disintegration in the presence of hydrogen peroxide, whereby the proteins contained in the substance are dissolved into the solution;

during the step of homogenizing, extracting thermal energy from the solution introduced by the homogenization;

separating insoluble components from the solution;

neutralizing the solution;

desalinating the solution; and concentrating the proteins contained in the solution by a drying process.

* * * * *